United States Patent
Adachi et al.

(10) Patent No.: US 6,481,306 B2
(45) Date of Patent: Nov. 19, 2002

(54) GEARED MOTOR HAVING SEAL MEMBER FOR RESTRAINING INTRUSION OF WATER OR THE LIKE

(75) Inventors: Tadashi Adachi, Kosai (JP); Hirofumi Sakai, Hamana-gun (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/911,426

(22) Filed: Jul. 25, 2001

(65) Prior Publication Data
US 2002/0020239 A1 Feb. 21, 2002

(30) Foreign Application Priority Data
Jul. 27, 2000 (JP) .................... 2000-227484

(51) Int. Cl.[7] .................. F16H 19/04; F16H 55/14
(52) U.S. Cl. .................. 74/425; 74/411; 74/89.14
(58) Field of Search .............. 74/411, 425, 89.14; 464/73, 76, 92, 149, 97, 75; 49/460; 242/125.1; 277/500, 549

(56) References Cited

U.S. PATENT DOCUMENTS

| | | | | |
|---|---|---|---|---|
| 3,455,174 A | * | 7/1969 | Pickles | 74/89.14 |
| 4,748,865 A | * | 6/1988 | Umezawa et al. | 74/425 |
| 4,899,608 A | * | 2/1990 | Knappe et al. | 74/411 |
| 4,995,568 A | * | 2/1991 | Yamagishi et al. | 242/125.1 |
| 5,040,430 A | * | 8/1991 | Adam et al. | 74/425 |
| 5,178,026 A | * | 1/1993 | Matsumoto | 74/411 |
| 5,212,999 A | * | 5/1993 | Kitada | 74/425 |
| 5,267,482 A | * | 12/1993 | Yoshida et al. | 74/425 |
| 5,956,998 A | * | 9/1999 | Fenelon | 74/411 X |
| 6,393,929 B1 | * | 5/2002 | Quere et al. | 74/411 |

* cited by examiner

Primary Examiner—Thomas R. Hannon
Assistant Examiner—Colby Hansen
(74) Attorney, Agent, or Firm—Law Offices of David G. Posz

(57) ABSTRACT

In a geared motor, a worm wheel and an output gear are rotatably supported about and slidably engaged with a center shaft. A transmitting plate connected to the output gear transmits rotation from the worm wheel to the output gear. An O-ring is fitted around the center shaft. The O-ring is sealingly surrounded on four sides in a seal retaining portion defined by an outer peripheral surface of the center shaft, an inner peripheral surface of the transmitting plate, an end surface of an annular protrusion of the worm wheel and one end surface of the output gear.

9 Claims, 5 Drawing Sheets

GEARED MOTOR HAVING SEAL MEMBER FOR RESTRAINING INTRUSION OF WATER OR THE LIKE

CROSS REFERENCE TO RELATED APPLICATION

This application is based on and incorporates herein by reference Japanese Patent Application No. 2000-227484 filed on Jul. 27, 2000.

BACKGROUND OF THE INVENTION

1. Field of the Invention

The present invention relates to a geared motor, and more specifically to a geared motor used in a power window system for moving up and down a vehicle door window glass.

2. Description of Related Art

For example, in the power window system for moving up and down the vehicle door window glass or in a power sunroof system for moving a vehicle sunroof forward and backward, a geared motor is used as a drive source. In one previously proposed geared motor, rotation of a rotatable shaft of the motor is reduced in speed by a worm wheel and is then transmitted to an output shaft. One previously proposed mechanism for transmitting the rotation of the worm wheel to the output shaft has the following structure. That is, the worm wheel is rotatably supported about and slidably engaged with a support shaft secured to a housing of the motor. A rotation transmitting member is arranged about the support shaft to oppose the worm wheel, such that the rotation transmitting member receives the rotation of the worm wheel upon engagement with projections or the like provided in an opposing end surface of the worm wheel. The rotation transmitting member is secured to an output gear that is rotatably supported about and slidably engaged with the support shaft. Furthermore, in order to reduce weight of the geared motor and also to improve assembly of the geared motor, the rotation transmitting member and the output gear are integrally formed together as an integral output shaft from a resin material.

In the above-described type of previously proposed geared motor, the size (particularly, thickness) and weight of the geared motor have been reduced, so that the geared motor can be placed within a vehicle door and a vehicle roof to operate the power window system and the sunroof system, respectively.

Furthermore, in the above-described geared motor, an O-ring is fitted around the support shaft to restrain penetration of water or the like into an interior of the housing. The O-ring is compressed in a radial direction of the support shaft between the support shaft and the output shaft (the rotation transmitting member) and is retained in place, for example, by a C-ring, so that the penetration of the water or the like into the interior of the housing through a boundary between the support shaft and the output shaft (output gear) is restrained.

In order to achieve a predetermined strength-required by an end system (load exerting side system), such as the power window system or the power sunroof system, the output gear is often required to be made of a metal material. On the other hand, a reduction in the weight of the entire geared motor has been demanded. To satisfy the demand, the rotation transmitting member can be manufactured from a resin material, and the output gear can be manufactured from the metal material. Then, the rotation transmitting member and the output gear can be insert molded together to form an integrated component (hereinafter referred to as an insert molded component).

Although this allows achievement of both the increased strength and the weight reduction of the geared motor, sealing needs to be provided between the constituents of the insert molded component. That is, in addition to the sealing between the support shaft and the output shaft (output gear) achieved with the O-ring, additional sealing needs to be provided between a connecting surface of the output gear and a corresponding connecting surface of the rotation transmitting member to be connected together.

To avoid the provision of this additional sealing, the following arrangement could be provided. That is, the rotation transmitting member can have a slidably engaging portion as an integral part thereof to be placed next to the output shaft. The slidably engaging portion of the rotation transmitting member has an inner diameter substantially the same as the inner diameter of the output gear and slidably engages the support shaft. An end surface of the slidably engaging portion of the rotation transmitting member is engaged with and is insert molded with an opposing end surface of the output shaft. In this way, the above mentioned additional sealing can be eliminated, and it is only required to provide the above mentioned O-ring that is compressed between the support shaft and the rotation transmitting member in the radial direction of the support-shaft and that is retained by the C-ring.

However, in the geared motor having the insert molded component, the output gear needs to be inserted to a predetermined depth within the rotation transmitting member to maintain the required strength of the insert molded component. Thus, the rotation transmitting member needs to have an additional thickness corresponding to the predetermined depth for inserting the output gear. In the geared motor having the rotation transmitting member provided with the slidably engaging portion to which none of the output gear and the O-ring can be inserted, since the slidably engaging portion cannot be eliminated, the thickness of the rotation transmitting member is disadvantageously increased, thereby increasing the thickness of the geared motor. Furthermore, provision of two O-rings at the above mentioned two sealing points may be possible but disadvantageously increases the number of the components and the number of the assembling steps.

SUMMARY OF THE INVENTION

The present invention addresses the above disadvantages. Thus, it is an objective of the present invention to provide a geared motor that can seal between a support shaft and an output gear and also between the output gear and a rotation transmitting member with a single seal member without substantially increasing a size of the geared motor.

To achieve the objective of the present invention, there is provided a geared motor including a housing, a support shaft, a worm wheel, a rotation transmitting member, an output gear and a seal member. The housing receives a worm connected to a rotatable shaft of the motor. The support shaft has one end secured to a base of the housing. The worm wheel is meshed with the worm within the housing. The worm wheel is rotatably supported about and slidably engaged with the support shaft. The rotation transmitting member is rotatably supported about the support shaft within the housing through a through hole axially penetrating through a center of the rotation transmitting member. The through hole of the rotation transmitting member has an inner diameter larger than an outer diameter of the support shaft. At least a portion of one end of the rotation transmitting member located around the through hole is slidably engaged with one end of the worm wheel. The rotation transmitting member is drivingly engageable with the worm wheel for receiving rotation of the worm wheel. The output gear is shaped into a generally cylindrical shape and is rotatably supported about and slidably engaged with the support shaft. One end of the output gear is secured to the other end of the rotation transmitting member such that the output gear integrally rotates with the rotation transmitting member. At least a portion of the output gear is protruding out of the housing. The seal member is fitted around the support shaft. The seal member is sealingly engaged with an outer peripheral surface of the support shaft, an inner peripheral surface of the rotation transmitting member, the one end of the worm wheel and the one end of the output gear, respectively.

In place of the above-described seal member, there can be provided a seal member placed in a seal retaining portion defined by the outer peripheral surface of the support shaft, the inner peripheral surface of the rotation transmitting member, the one end of the worm wheel and the one end of the output gear. This seal member seals between the support shaft and the output gear and also between the rotation transmitting member and the output gear, respectively.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
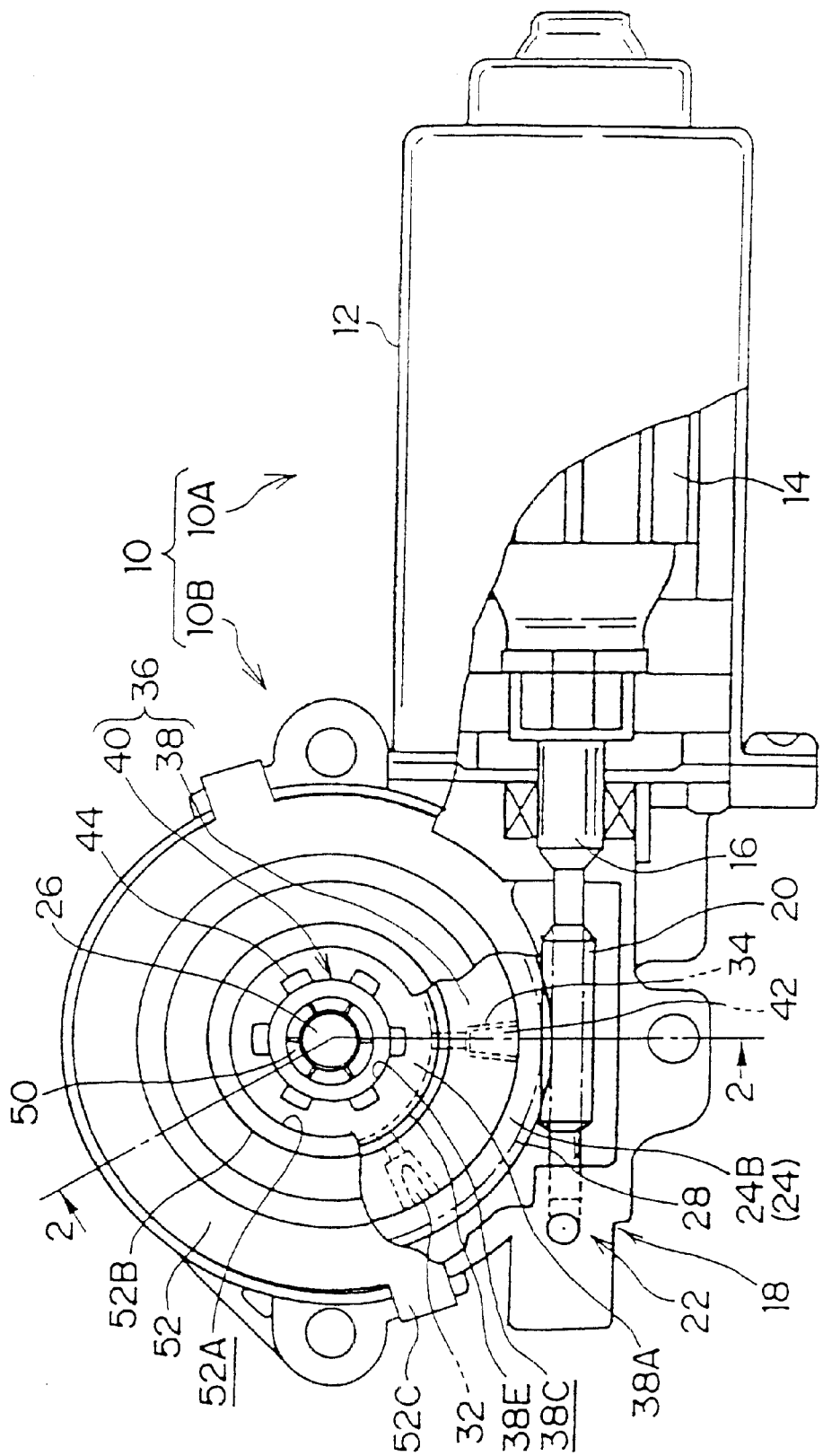
FIG. 1 is a partially cutaway plan view of a geared motor according to an embodiment of the present invention.
Figure 2:
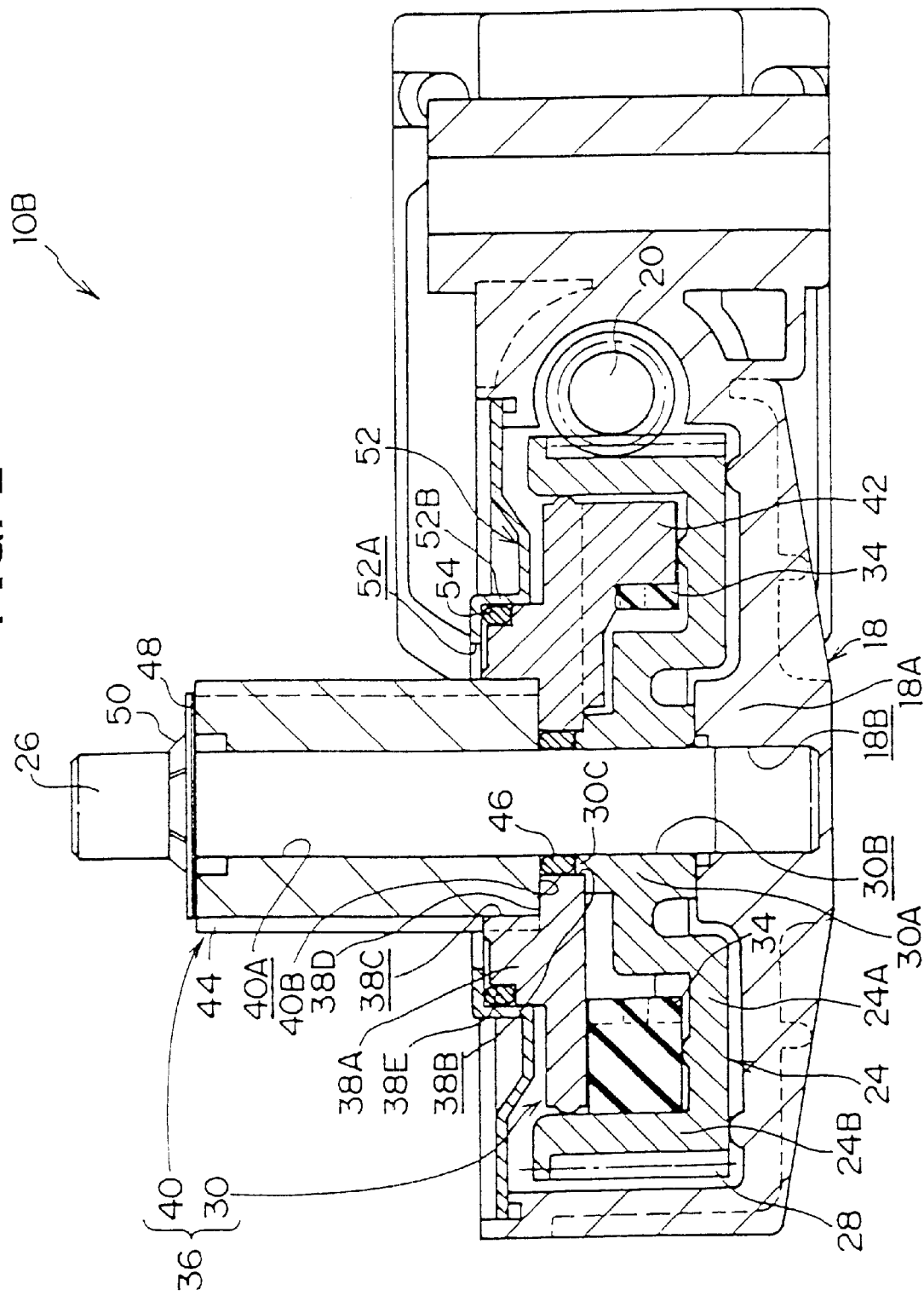
FIG. 2 is a cross sectional view along line 2—2 in FIG. 1.

A geared motor 10 according to one embodiment of the present invention will be described with reference to FIGS. 1 to 4.

The geared motor 10 includes a motor unit 10A and a gear unit 10B connected to the motor unit 10A. Within a yoke 12 of the motor unit 10A, one end of an armature shaft 16 of an armature 14 (rotatable shaft of the motor) is supported by a bearing (not shown).

A distal end of the armature shaft 16 extends into an interior of a gear housing 18. The gear housing 18 is made of a resin material and constitutes a portion of the gear unit 10B connected to the yoke 12.

In the gear unit 10B, a worm 20 is connected to the armature shaft 16. A distal end of the worm 20 is supported by the gear housing 18 via a bearing 22. The gear housing 18 is generally cup shaped and receives the worm 20 and a worm wheel 24. The worm wheel 24 is made of a resin material and is meshed with the worm 20. At the center of a base portion of the gear housing 18, there is formed a boss 18A having a blind boss hole 18B. A center shaft 26 is secured within the boss hole 18B of the boss 18A. The center shaft 26 is made of a metal material and acts as a support shaft.

Figure 3:
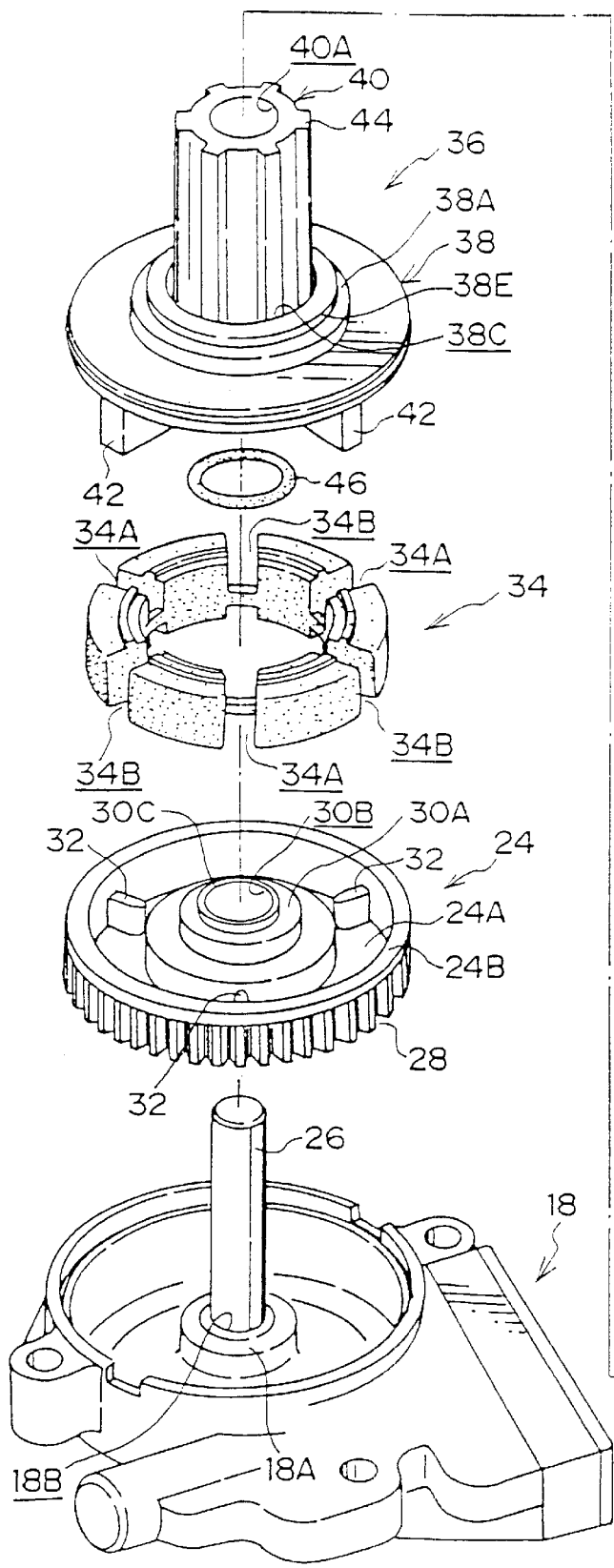
FIG. 3 is an exploded partial perspective view of the geared motor according to the embodiment.
Figure 3:
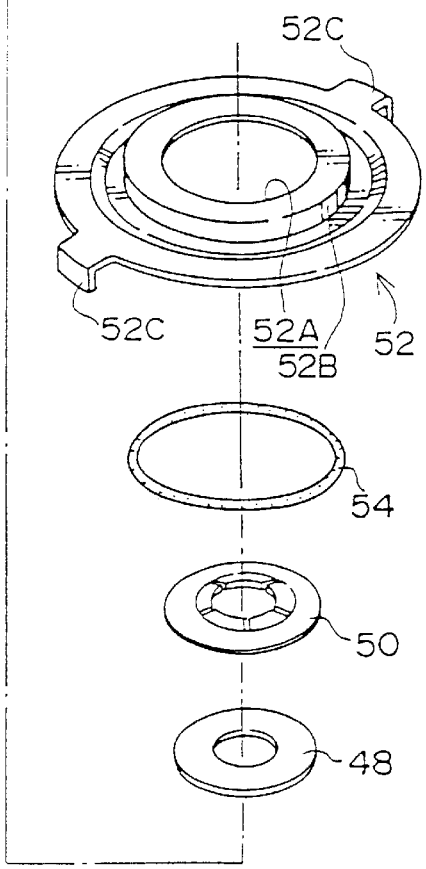

As shown in FIG. 3, the gear unit 10B includes the worm wheel 24. The worm wheel 24 is generally cup shaped and has a base portion 24A and a cylindrical portion 24B. A worm gear 28 is formed in an outer peripheral portion of the cylindrical portion 24B and is meshed with the worm 20. The worm wheel 24 has a support boss 30A. The support boss 30A axially protrudes from the center of the base portion 24A of the worm wheel 24 and is thickened. A shaft hole 30B axially penetrates through the support boss 30A and has an inner diameter substantially equal to an outer diameter of the center shaft 26. The shaft hole 30B receives and slidably engages with the center shaft 26.

At one end surface of the support boss 30A, there is formed a generally annular protrusion 30C that has an inner peripheral surface extending along the shaft hole 30B. With the above-described structure, upon insertion of the center shaft 26 within the shaft hole 30B and engagement of an end surface of the boss 18A of the gear housing 18 with an opposing end surface of the support boss 30A, the worm wheel 24 is rotatably (slidably) supported, and the worm gear 28 formed in the outer peripheral portion of the cylindrical portion 24B is meshed with the worm 20.

In the base portion 24A of the worm wheel 24, a plurality (three in this embodiment) of engaging projections 32 are arranged at substantially equal angular intervals along an inner peripheral surface of the cylindrical portion 24B.

A cushion rubber 34 is received within an interior of the worm wheel 24. The cushion rubber 34 has a generally cylindrical shape with a relatively small height and includes a plurality (a total of six in this embodiment) of slits 34A, 34B (three each in this embodiment). The slits 34A and the slits 34B are alternatively arranged at substantially equal angular intervals along an outer peripheral portion of the cushion rubber 34. The cushion rubber 34 is received on the base portion 24A of the worm wheel 24 within the cylindrical portion 24B, and the engaging projections 32 of the worm wheel 24 are received within the corresponding slits 34A of the cushion rubber 34.

The gear unit 10B also includes an output shaft 36. The output shaft 36 includes a transmitting plate 38 and an output gear 40. The transmitting plate 38 is made of a resin material and acts as a rotation transmitting member. The output gear 40 is made of a metal material. The transmitting plate 38 and the output gear 40 are integrated together by insert molding.

The transmitting plate 38 is disk shaped. On one side (top surface in FIG. 2) of the transmitting plate 38, the center of transmitting plate 38 is thickened and forms an insert portion 38A. In the insert portion 38A, there is formed a seal retaining hole (through hole) 38B that extends from a bottom side of the transmitting plate 38 in FIG. 2. The retaining hole 38B has an inner diameter larger than an outer diameter of the center shaft 26 and substantially equal to an outer diameter of the annular protrusion 30C of the worm wheel 24. Furthermore, in the insert portion 38A, there is also formed an insert hole 38C that extends from a top surface of the transmitting plate 38 in FIG. 2. The insert hole 38C has an inner diameter larger than an inner diameter of the seal retaining hole 38B and corresponds to an output gear 40. The seal retaining hole 38B and the insert hole 38C are communicated with each other at an axially middle region of the insert portion 38A. At a boundary between the seal retaining hole 38B and the insert hole 38C, there is provided a step-like engaging surface 38D to which one end surface of the output gear 40 engages. Furthermore, at one end of the insert portion 38A, there is formed a step-like seal retaining surface 38E extending around an outer peripheral portion of the insert portion 38A.

A plurality (three in this embodiment) of engaging pieces 42 corresponding to the slits 34B of the cushion rubber 34 are provided at substantially equal angular intervals in an end surface of the transmitting plate 38 on a side where the seal retaining hole 38B is formed. The transmitting plate 38 is placed on the cushion rubber 34 within the cylindrical portion 24B of the worm wheel 24 while the engaging pieces 42 of the transmitting plate 38 are received within the corresponding slits 34B of the cushion rubber 34. With the above-described arrangement, rotation of the worm wheel 24 is transmitted to the transmitting plate 38 through the engaging projections 32 and the cushion rubber 34.

At this state, the end surface (end surface around the annular protrusion 30C) of the support boss 30A of the worm wheel 24 is slidably engaged with an opposing end surface of the transmitting plate 38 located around the seal support hole 38B of the transmitting plate 38, and the annular protrusion 30C of the worm wheel 24 is received within the seal retaining hole 38B of the transmitting plate 38.

The output gear 40 is generally cylindrically shaped and has teeth 44 and a support hole 40A. The teeth 44 are provided around an outer peripheral portion of the output gear 40. An inner diameter of the support hole 40A is substantially the same as the outer diameter of the center shaft 26 and allows an inner peripheral surface of the output gear 40 to slide along an outer peripheral surface of the center shaft 26. The output gear 40 is inserted and is secured (insert molded) within the insert hole 38C while the one end surface 40B of the output gear 40 engages with the engaging surface 38D of the transmitting plate 38, so that the output gear 40 rotates always integrally with the transmitting plate 38. The output gear 40 is inserted within the transmitting plate 38 to a predetermined depth that is selected to satisfy a required strength determined by an end system (load exerting side system), such as the power window system.

The output shaft 36, which includes the transmitting plate 38 and the output gear 40 integrated together by the insert molding, is arranged such that the transmitting plate 38 is placed on the cushion rubber 34 within the cylindrical portion 24B of the worm wheel 24 while the center shaft 26 is inserted within the support hole 40A of the output gear 40.

Figure 4:
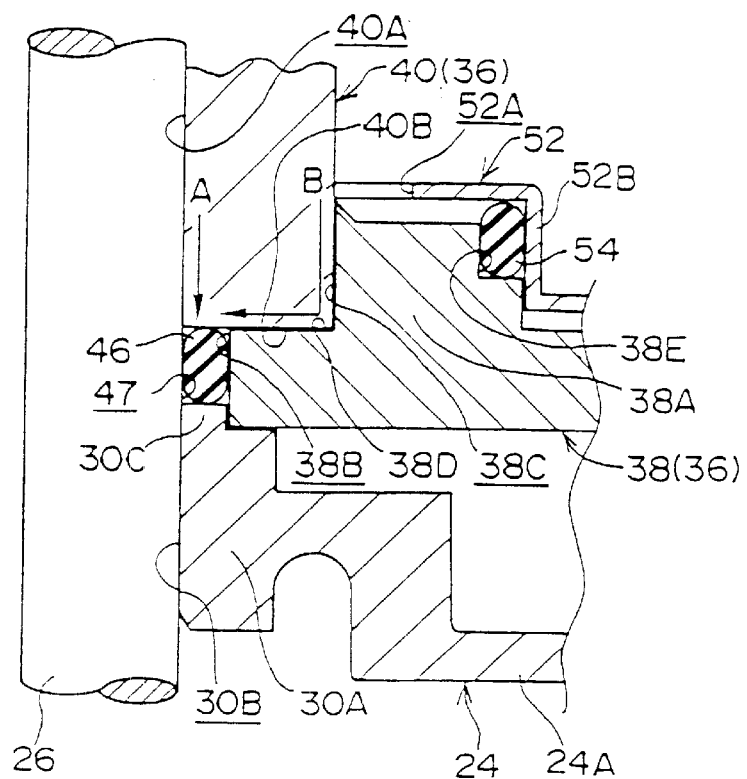
FIG. 4 is a partial enlarged cross-sectional view of the geared motor according to the embodiment.

In the gear unit 10B, an O-ring 46 acting as a seal member is fitted around the center shaft 26. In a relaxed state of the O-ring 46, an inner diameter of the O-ring 46 is slightly smaller than the outer diameter of center shaft 26, and an outer diameter of the O-ring 46 is slightly larger than an inner diameter of the seal retaining hole 38B of the transmitting plate 38. The O-ring .46 is fitted around the center shaft 26 after installation of the worm wheel 24 around the center shaft 26 but before installation of the output shaft 36 (the transmitting plate 38 and the output gear 40). As shown in FIG. 4, upon installation of the output shaft 36, the O-ring 46 is compressed between the outer peripheral surface of the center shaft 26 and the inner peripheral surface of the seal retaining hole 38B of the transmitting plate 38 in a radial direction of the center shaft 26. Furthermore, the O-ring 46 is also compressed between an end surface of the annular protrusion 30C of the worm wheel 24 received in the seal retaining hole 38B and the one end surface 40B of the output gear 40 in an axial direction of the center shaft 26.

That is, the O-ring 46 is placed around the center shaft 26 while it is sealingly surrounded on four sides. The outer peripheral surface of the center shaft 26, the inner peripheral surface of the seal retaining hole 38B of the transmitting plate 38, the end surface of the annular protrusion 30C of the worm wheel 24 and the one end surface 40B of the output gear 40 define a space so called a seal retaining portion 47.

A lock washer 50 is fitted around a free end of the center shaft 26 at the other end of the output gear 40 via a resin washer 48 that restrains generation of noises by sliding movement, so that the worm wheel 24, the output shaft 36 and the like are held in place or prevented from moving away from the center shaft 26.

A cover plate 52 is then fitted to an opening of the gear housing 18. The cover plate 52 has a generally disk shape. An exit hole 52A penetrates through the center of the cover plate 52. The exit hole 52A has an inner diameter larger than an outer diameter of the output gear 40. A short cylindrical portion 52B is formed radially outward of the exit hole 52A. The short cylindrical portion 52B has an inner diameter that is substantially the same as an outer diameter of the insert portion 38A of the transmitting plate 38. The cover plate 52 has a pair of retaining portions 52C. The cover plate 52 is fitted to and is retained by an inner peripheral surface of the gear housing 18 at the opening thereof, and the retaining portions 52C of the cover plate 52 are bent against an outer peripheral surface of the gear housing 18, so that the cover plate 52 is prevented from moving away from the gear housing 18.

An O-ring 54 is provided between the cover plate 52 and the transmitting plate 38 to restrain intrusion of water or the like into the gear housing 18 through a space between the cover plate 52 and the output shaft 36. After the cover plate 52 is installed while the O-ring 54 is fitted around the seal retaining surface 38E of the transmitting plate 38, the O-ring 54 is compressed between the seal retaining surface 38E of the transmitting plate 38 and an inner peripheral surface of the short cylindrical portion 52B of the cover plate 52 and is prevented from moving away from the seal retaining surface 38E by an annular disk surface of the cover plate 52 axially positioned next to the O-ring 54 (axially positioned on the top side of the O-ring 54 in FIG. 4).

A lubricant (e.g., grease, oil or the like) is applied between the center shaft 26 and the shaft hole 30B of the worm wheel 24, between the center shaft 26 and the support hole 40A of the output shaft 36 (output gear 40), between the boss 18A of the gear housing 18 and the support boss 30A of the worm wheel 24, between the end surface of the support boss 30A of the worm wheel 24 and the end surface of the transmitting plate 38 along a perimeter of the seal retaining hole 38B, and around the O-ring 46 and O-ring 54 to allow smooth slide movement of these components.

Operation of the present embodiment will now be described.

In the above-described geared motor 10, when the motor unit 10A is activated to rotate the armature shaft 16, the worm wheel 24 meshed with the worm 20, which is in turn connected to the armature shaft 16, is rotated about the center shaft 26, so that a rotational speed of the armature shaft 16 is reduced at the worm wheel 24. A rotational force of the worm wheel 24 is transmitted to the cushion rubber 34 through the engaging projections 32 received within the corresponding slits 34A of the cushion rubber 34. Then, a rotational force of the cushion rubber 34 is transmitted to the transmitting plate 38 through the engaging pieces 42 received within the corresponding slits 34B of the cushion rubber 34. The transmitting plate 38 and the output gear 40 are formed as the integral output shaft 36 by the insert molding and always rotate together. Thus, the output gear 40 is also rotated by the rotational force transmitted to the transmitting plate 38 to drive an end system or device (e.g., the power window system) connected thereto.

Since the transmitting plate 38 acting as the rotation transmitting member is shaped into the short cylindrical shape including the seal retaining hole 38B having an inner diameter larger than the outer diameter of the center shaft 26, and the O-ring 46 is placed at the inner peripheral portion of the seal retaining hole 38B, a thickness of the transmitting plate 38 can be minimized.

As the inner diameter of the seal retaining hole 38B of the transmitting plate 38 is made to be larger than the outer diameter of the center shaft 26, the O-ring 46 can provide two sealing points against the penetration of the water or the like into the interior of the gear housing 18 along the output gear 40 rather than providing only one seal point around the center shaft 26. These two sealing points include a boundary (indicated with an arrow A in FIG. 4) between the outer peripheral surface of the center shaft 26 and the inner peripheral surface of the support hole 40A of the output gear 40 and a boundary (indicated with an arrow B in FIG. 4) between the outer peripheral surface of the output gear 40 and the inner peripheral surface of the insert hole 38C of the transmitting plate 38 and between the one end surface 40B of the output gear 40 and the engaging surface 38D of the transmitting plate 38.

The O-ring 46 is compressed in both the radial and axial directions of the center shaft 26 by the outer peripheral surface of the center shaft 26, the inner peripheral surface of the seal retaining hole 38B of the transmitting plate 38, the end surface of the annular protrusion 30C of the worm wheel 24 and the one end surface 40B of the output gear 40, so that the O-ring 46 is sealingly surrounded on four sides to ensure sealing at the above mentioned two sealing points. That is, the penetration of the water or the like into the interior of the gear housing 18 through the two sealing points is effectively restrained by only one O-ring 46.

In other words, both the boundaries indicated with the arrows A and B in FIG. 4 are sealed by the O-ring 46 acting as the seal member placed in the seal retaining portion 47 surrounded by the outer peripheral surface of the center shaft 26, the inner peripheral surface of the seal retaining hole 38B of the transmitting plate 38, the end surface of the annular protrusion 30C of the worm wheel 24 and the one end surface 40B of the output gear 40. Thus, the penetration of the water or the like into the interior of the gear housing 18 through the two sealing points is effectively restrained. Furthermore, since the only one O-ring 46 is used, the number of the components is not increased, and the required assembly work is minimized.

As described above, in the geared motor 10 according to the present embodiment, the two sealing points, i.e., the sealing point between the outer peripheral surface of the center shaft 26 and the inner peripheral surface of the support hole 40A of the output gear 40 and the sealing point between the one end surface 40B of the output gear 40 and the engaging surface 38D of the transmitting plate 38 (also between the outer peripheral surface of the output gear 40 and the inner peripheral surface of the insert hole 38C of the transmitting plate 38) are securely sealed by the one O-ring 46 without substantially increasing the size of the geared motor 10.

Since the annular protrusion 30C of the worm wheel 24 is constructed to be received between the outer peripheral surface of the center shaft 26 and the inner peripheral surface of the seal retaining hole 38B of the transmitting plate 38 to constitute one wall surface of the seal retaining portion 47 (the O-ring 46 is compressed between the annular protrusion 30C and the one end surface 40B of the output gear 40 in the axial direction of the center shaft 26), the size (a space between the end surface of the annular protrusion 30C and the one end surface 40B of the output gear 40) of the seal retaining portion 47 in the axial direction of the center shaft 26 can be adjusted. That is, the seal retaining portion 47 can be adjusted based on the size of the O-ring 46, so that a universal (ready made) O-ring 46 can be used to achieve a low cost.

Furthermore, since the transmitting plate 38 and the output gear 40 are integrally formed by the insert molding, i.e., the transmitting plate 38 and the output gear 40 are constructed as one component, the number of the components and the number of assembling steps can be reduced.

Particularly, since the output gear 40 is made of the metal material, the geared motor according to the present embodiment can be appropriately used in a case where a relatively high strength is required by a load exerting side system (e.g., power window system). Since the transmitting plate 38, which is insert molded together with the metal output gear 40, is made of the resin material, the weight of the geared motor according to the present embodiment is smaller than the geared motor having the transmitting plate 38 and the output gear 40 both made of the metal material.

Figure 5:
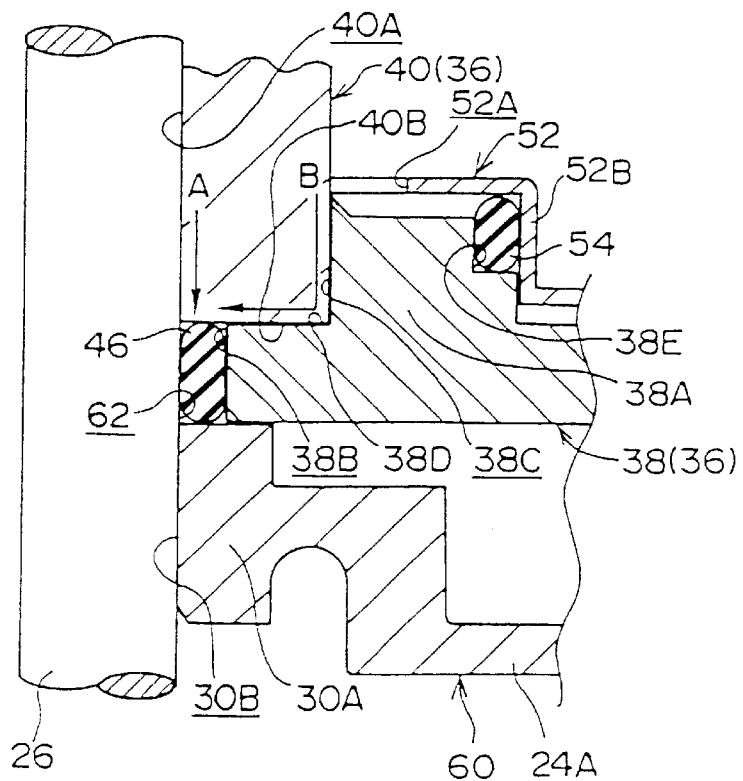
FIG. 5 is a partial enlarged cross-sectional view showing a modification of FIG. 4.

In the above embodiment, the worm wheel 24 has the annular protrusion 30C. However, the present invention is not limited to this. For example, as shown in FIG. 5, in place of the worm wheel 24, a worm wheel 60 having no annular protrusion 30C can be used. In this arrangement, in place of the annular protrusion 30C, one end surface of the support boss 30A of the worm wheel 60 constitutes one wall surface of a seal retaining portion 62, and the O-ring 46 is compressed between the one end surface of the support boss 30A and the one end surface 40B of the output gear 40 in the axial direction of the center shaft 26. With this arrangement, the insert hole 38C of the transmitting plate 38 can be advantageously elongated (deepened) to satisfy the required strength demanded by the load exerting side system without increasing the thickness of the transmitting plate 38 while providing the seal retaining portion 62 of an appropriate size that corresponds to the size of the O-ring 46.

Figure 6:
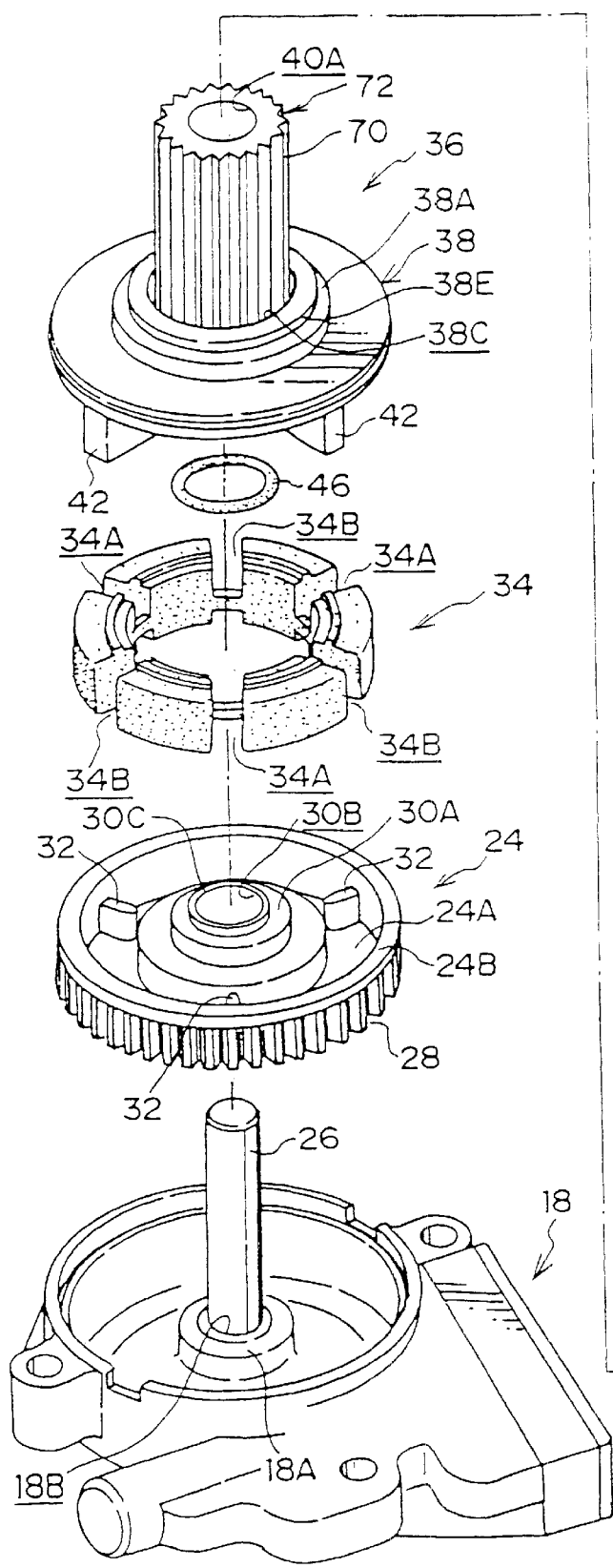
FIG. 6 is an exploded partial perspective view showing a modification of FIG. 3.
Figure 6:
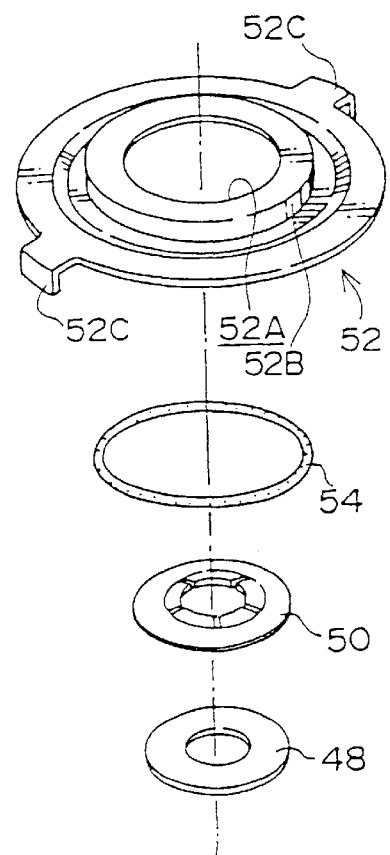

Furthermore, in the above embodiment, there is provided the output gear 40 having the spline-like teeth 44, each with a rectangular lateral cross-section. However, the present invention is not limited to this. For example, as shown in FIG. 6, in place of the output gear 40, it is possible to provide a pinion-like output gear 72 having teeth 70, each with a triangular or trapezoid lateral cross-section. For example, the geared motor having the output gear 40 is suitable for a power window system having a window regulator of a wire type. In this case, the output gear 40 is inserted within a shaft hole arranged in a wire winding shaft of the power window system. The geared motor having the output gear 72 is suitable for a power window system having a window regulator of an X-arm type. The teeth 70 of the output gear 72 are meshed with a driven gear of the power window system.

In the above embodiment, the integral output shaft 36 is provided by insert molding the transmitting plate 38 and the output gear 40 together. The present invention is not limited to this arrangement. For example, the integral output shaft 36 can be provided by connecting the transmitting plate 38 and the output gear 40 together with bolts, pins or the like while the end surface of the transmitting plate 38 is engaged with the end surface of the output gear 40.

Furthermore, in the above embodiment, the rotation of the worm wheel 24 is transmitted to the output shaft 36 through the integrally manufactured cushion rubber 34. The present invention is not limited to this arrangement. For example, the rotation of the worm wheel 24 can be transmitted to the output shaft 36 through the cushion rubbers 34 that are separated at each slit 34A, 34B. Also, the worm wheel 24 and the transmitting plate 38 can be integrated together, and the cushion rubber 34, the engaging projections 32 and the engaging pieces 42 can be arranged between the transmitting plate 38 and the output gear 40.

In addition, in the above arrangement, the sealing between the cover plate 52 and the output shaft 36 is achieved with the O-ring 54. However, the present invention is not limited to this arrangement. For example, the sealing between the cover plate 52 and the output shaft 36 can be achieved with a rubber sheet that is arranged around the inner peripheral portion of the cover plate 52 and that is slidably engageable with the output shaft 36.

Additional advantages and modifications will readily occur to those skilled in the art. The invention in its broader terms is therefore, not limited to the specific details, representative apparatus, and illustrative examples shown and described.

What is claimed is:

1. A geared motor comprising:
   a housing receiving a worm connected to a rotatable shaft of said motor;
   a support shaft having one end secured to a base of said housing;
   a worm wheel meshed with said worm within said housing, said worm wheel being rotatably supported about and slidably engaged with said support shaft;
   a rotation transmitting member being rotatably supported about said support shaft within said housing through a through hole axially penetrating through a center of said rotation transmitting member, said through hole of said rotation transmitting member having an inner diameter larger than an outer diameter of said support shaft, at least a portion of one end of said rotation transmitting member located around said through hole being slidably engaged with one end of said worm wheel, said rotation transmitting member being drivingly engageable with said worm wheel for receiving rotation of said worm wheel;
   an output gear being shaped into a generally cylindrical shape and being rotatably supported about and slidably engaged with said support shaft, one end of said output gear being secured to the other end of said rotation transmitting member such that said output gear integrally rotates with said rotation transmitting member, at least a portion of said output gear being protruding out of said housing; and
   a seal member fitted around said support shaft, said seal member being sealingly engaged with an outer peripheral surface of said support shaft, an inner peripheral surface of said rotation transmitting member, said one end of said worm wheel and said one end of said output gear, respectively.

2. A geared motor comprising:
   a housing receiving a worm connected to a rotatable shaft of said motor;
   a support shaft having one end secured to a base of said housing;
   a worm wheel meshed with said worm within said housing, said worm wheel being rotatably supported about and slidably engaged with said support shaft;
   a rotation transmitting member being rotatably supported about said support shaft within said housing through a through hole axially penetrating through a center of said rotation transmitting member, said through hole of said rotation transmitting member having an inner diameter larger than an outer diameter of said support shaft, at least a portion of one end of said rotation transmitting member located around said through hole being slidably engaged with one end of said worm wheel, said rotation transmitting member being drivingly engageable with said worm wheel for receiving rotation of said worm wheel;
   an output gear being shaped into a generally cylindrical shape and being rotatably supported about and slidably engaged with said support shaft, one end of said output gear being secured to the other end of said rotation transmitting member such that said output gear integrally rotates with said rotation transmitting member, at least a portion of said output gear being protruding out of said housing; and
   a seal member placed in a seal retaining portion defined by an outer peripheral surface of said support shaft, an inner peripheral surface of said rotation transmitting member, said one end of said worm wheel and said one end of said output gear, said seal member seals between said support shaft and said output gear and also between said rotation transmitting member and said output gear, respectively.

3. A geared motor according to claim 2, wherein said worm wheel has an annular protrusion in said one end of said worm wheel, said annular protrusion being received between said outer peripheral surface of said support shaft and said inner peripheral surface of said rotation transmitting member, such that said annular protrusion constitutes one wall surface of said seal retaining portion.

4. A geared motor according to claim 1, wherein said rotation transmitting member is integrated with said output gear by insert molding.

5. A geared motor according to claim 4, wherein said output gear is made of a metal material.

6. A geared motor according to claim 5, wherein said rotation transmitting member is made of a resin material.

7. A geared motor according to claim 1, wherein said seal member is an O-ring.

8. A geared motor according to claim 1, wherein said output gear is received within and secured to an insert hole recessed in said other end of said rotation transmitting member, said insert hole being communicated with said through hole of said rotation transmitting member.

9. A geared motor according to claim 1, wherein said worm wheel has an annular protrusion in said one end of said worm wheel, said annular protrusion being received within said through hole of said rotation transmitting member and being sealingly engaged with said seal member.

* * * * *